US008428121B2

(12) United States Patent
Mizuno et al.

(10) Patent No.: US 8,428,121 B2
(45) Date of Patent: Apr. 23, 2013

(54) IMAGE PICK-UP APPARATUS FOR SHOOTING AND REPRODUCING A MOVING IMAGE

(75) Inventors: Kimiyasu Mizuno, Akishima (JP); Jun Muraki, Hamura (JP); Koki Dobashi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 906 days.

(21) Appl. No.: 12/539,046

(22) Filed: Aug. 11, 2009

(65) Prior Publication Data

US 2010/0039554 A1 Feb. 18, 2010

(30) Foreign Application Priority Data

Aug. 13, 2008 (JP) .................... 2008-208388

(51) Int. Cl.
*H04N 7/12* (2006.01)
(52) U.S. Cl.
USPC ....................................... 375/240.01
(58) Field of Classification Search .......... 375/240, 375/240.01; 348/221.1, 441
See application file for complete search history.

(56) References Cited

U.S. PATENT DOCUMENTS

| 7,209,601 | B2 | 4/2007 | Manabe |
| 7,889,974 | B2 | 2/2011 | Oka |
| 2004/0081437 | A1 | 4/2004 | Asada et al. |
| 2007/0091204 | A1* | 4/2007 | Koshimizu et al. ........... 348/441 |
| 2007/0229699 | A1 | 10/2007 | Hamamura et al. |
| 2008/0068485 | A1 | 3/2008 | Yuyama |
| 2008/0089406 | A1 | 4/2008 | Fukuhara et al. |
| 2008/0297613 | A1* | 12/2008 | Takahashi et al. ......... 348/221.1 |

FOREIGN PATENT DOCUMENTS

| CN | 1577877 A | 2/2005 |
| CN | 101090459 A | 12/2007 |
| JP | 2003-209801 A | 7/2003 |
| JP | 2004-242267 A | 8/2004 |
| JP | 2006-33242 A | 2/2006 |
| JP | 2006-157153 A | 6/2006 |
| JP | 2006-333071 A | 12/2006 |
| JP | 2008-035280 A | 2/2008 |
| JP | 2008-099173 A | 4/2008 |

OTHER PUBLICATIONS

Japanese Office Action dated Oct. 25, 2011 (and English translation thereof) in counterpart Japanese Application No. 2008-208388.
Japanese Office Action dated Jan. 17, 2012 (and English translation thereof) in counterpart Japanese Application No. 2008-208388.
Chinese Office Action dated Jun. 28, 2010 and English translation thereof, issued in counterpart Chinese Application No. 200910167010.3.

* cited by examiner

*Primary Examiner* — Allen Wong
(74) *Attorney, Agent, or Firm* — Holtz, Holtz, Goodman & Chick, P.C.

(57) ABSTRACT

A user friendly image pick-up apparatus is provided, which is capable of reproducing a moving image in various ways. The image pick-up apparatus 100 is provided with a display device 5 and an image processing circuit 2, wherein the display device reproduces a moving image at a reproducing speed based on plural image frames produced by an image pick-up unit 1, and the image processing circuit adds and combines a predetermined number of image frames among the plural image frames produced by the image pick-up unit to successively produce standard frames to be produced at a standard reproducing frame rate and successively produces difference image data between the standard frame and each of the predetermined image frames.

17 Claims, 9 Drawing Sheets

FIG. 2

STANDARD IMAGE DATA STORED
IN STANDARD IMAGE FILE

DIFFERENCE IMAGE DATA STORED
IN DIFFERENCE IMAGE FILE (1)  ~d1    d2~

(2)  ~d2    d2~ d2~ d2~

DIFFERENCE IMAGE DATA
CORRESPONDING TO
STANDARD IMAGE DATA (1)

d2~ d2~ d2~ d2~

DIFFERENCE IMAGE DATA
CORRESPONDING TO
STANDARD IMAGE DATA (2)

IMAGE PICK-UP APPARATUS FOR SHOOTING AND REPRODUCING A MOVING IMAGE

BACKGROUND OF THE INVENTION

1. Field of the Invention

The present invention relates to an image pick-up apparatus provided with a function of shooting and reproducing a moving image, a method of controlling the image pick-up apparatus, and a computer readable recording medium.

2. Description of the Related Art

Conventional digital cameras are known, which are capable of shooting one scene at a predetermined shooting frame rate (for example, 30 fps. and/or 60 fps.) to produce plural continuous image frames, and switching the plural image frames at a predetermined reproducing frame rate, hereby reproducing a moving image.

In recent, a digital camera has been developed, which is capable of shooting a moving image at a frame rate (for example, 240 fps.) higher than a frame rate employed in the conventional digital cameras. When image data produced with the digital camera is reproduced in slow motion, an ultra slow motion image reproduction can be realized with a temporal resolution higher than in the conventional digital cameras.

A reproducing apparatus is also known, which employs a moving image compressing technique that can change the number of pictures composing GOP (Group of Picture) in response to a slow motion reproducing speed (For example, refer to Japanese Patent 2003-209801 A).

Meanwhile, it is well known that the higher frame rate of shooting a moving image, the shorter exposure time per frame. Shooting at a high speed shooting frame rate has a disadvantage that needs a sensitizing process, which causes noises in image data. This disadvantage cannot be solved by the above moving image compressing technique which changes the number of pictures of GOP depending on the reproducing speed as disclosed in the above patent document.

For example, even if a digital camera is used, in which a shooting frame rate can be selected by a user for shooting a moving image, the user who wants to take a clear image with less noises would select a normal shooting frame rate rather than a high shooting frame rate, since visible noises are easily involved in image data that is produced at a high shooting frame rate. It may be considered to add and combine plural image frames to eliminate noise components from image data, but the user who wants to take a clear image would like to review a scene at a crucial moment in an ultra slow motion with a high temporal resolution.

SUMMARY OF THE INVENTION

According to one aspect of the invention, there is provided an image pick-up apparatus which comprises an image pick-up unit for shooting a scene at a predetermined shooting frame rate to successively produce plural image frames, a reproducing unit for reproducing a moving image at a reproducing speed based on the plural image frames produced by the image pick-up unit, a standard frame producing unit for adding and combining a predetermined number of image frames among the plural image frames produced by the image pick-up unit to successively produce standard frames to be reproduced at a standard reproducing frame rate by the reproducing unit, wherein the standard reproducing frame rate is lower than the predetermined shooting frame rate, and a difference information producing unit for successively producing difference information between the standard frame and each of the predetermined number of image frames to be added and combined by the standard frame producing unit.

According to another aspect of the invention, there is provided a computer readable recording medium to be mounted on an image pick-up apparatus provided with a computer and an image pick-up unit for shooting a scene at a predetermined shooting frame rate to successively produce plural image frames, the recording medium having recorded thereon a computer program when executed to make the computer function as means which comprises reproducing means for reproducing a moving image at a reproducing speed based on the plural image frames produced by the image pick-up unit, standard frame producing means for adding and combining a predetermined number of image frames among the plural image frames produced by the image pick-up unit to successively produce standard frames to be reproduced at a standard reproducing frame rate by the reproducing means, wherein the standard reproducing frame rate is lower than the predetermined shooting frame rate, and difference information producing means for successively producing difference information between the standard frame and each of the predetermined number of image frames to be added and combined by the standard frame producing means.

DETAILED DESCRIPTION OF THE PREFERRED EMBODIMENTS

Now, specific embodiments of the present invention will be described with reference to the accompanying drawings. But the scope of the invention is by no means restricted to the embodiments illustrated in the drawings.

Figure 1:
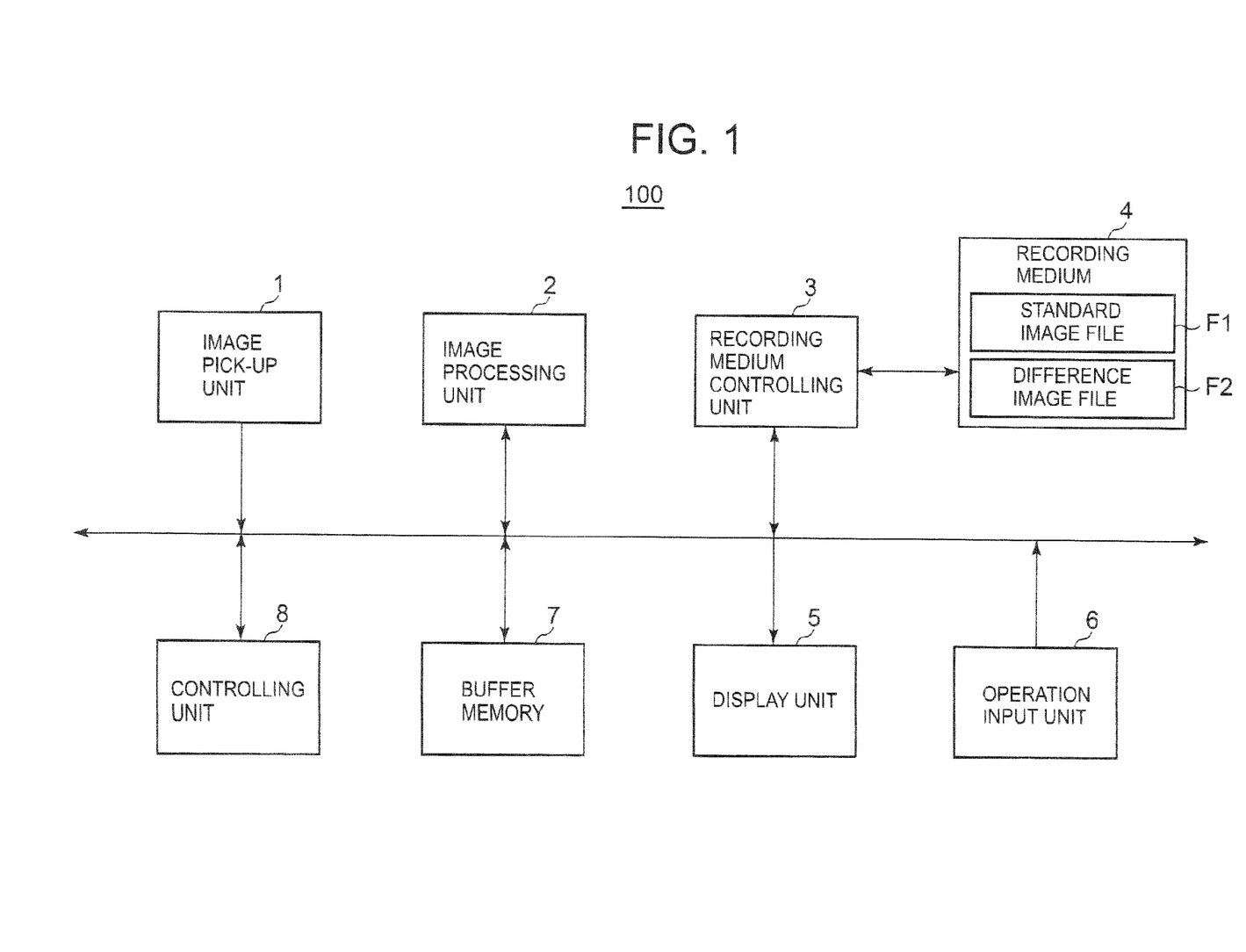
FIG. 1 is a block diagram of a circuit configuration of an embodiment of an image pick-up apparatus in which the present invention is employed.

FIG. 1 is a block diagram of a circuit configuration of an embodiment of an image pick-up apparatus 100 using the present invention.

The image pick-up apparatus 100 of the invention successively adds and combines a predetermined number of image frames G among plural image frames G, . . . (Refer to FIG. 4) generated by an image pick-up unit 1, thereby successively producing standard image data d1 of standard frames corresponding to a reproducing frame rate (standard reproducing frame rate) that is lower than a shooting frame rate. Further, the image pick-up apparatus 100 successively produces difference image data d2 (Refer to FIG. 4) between the standard frame and each of the predetermined number of image frames G.

As shown in FIG. 1, the image pick-up apparatus 100 comprises the image pick-up unit 1, an image processing unit 2, a recording medium controlling unit 3, a recording medium 4, a display unit 5, an operation input unit 6, a buffer memory 7, and a controlling unit 8.

The image pick-up unit 1 continuously shoots one scene at a predetermined shooting rate, for example, at 240 fps. to produce plural image frames G, . . . . The image pick-up unit 1 has an image pick-up lens (not shown), an electronic image pick-up unit (not shown) and a shooting control unit (not shown) The electronic image pick-up unit includes CCD (Charge Coupled Device) and/or CMOS (Complementary Metal Semiconductor), which convert an object image passing through the image pick-up lens into a two-dimensional image signal. The shooting control unit controls operation of the electronic image pick-up unit, and controls AE (automatic exposure process), AF (automatic focusing process) and AWB (automatic white balancing process). The shooting control unit makes the electronic image pick-up unit shoot with an exposure time corresponding to a predetermined shooting frame rate, and successively reads the image frames G from a shooting area of the electronic image pick-up unit at the predetermined shooting frame rate. Thereafter, the shooting control unit performs an intensifying process on the read image frames G to obtain clear image frames, and then successively transfers and stores the image frames in the buffer memory 7.

Under control of CPU (to be described later) included in the controlling unit 8, every time four frames of image data has been stored in the buffer memory 7 in a moving image shooting operation, the image processing unit 2 reads the image data from the buffer memory 7 and performs a plural frame adding process on the image data. In other words, the image processing unit 2 averages every picture element of four continuous image frames G to produce a standard frame. Using plural produced standard frames, a moving image is produced to be reproduced at a frame rate of 60 fps., wherein the frame rate corresponds to the standard reproducing frame rate lower than the shooting frame rate. The image processing unit 2 transfers and stores standard image data d1 of the produced standard frame in the buffer memory 7.

As described above, since four frames of image data are averaged to produce one standard frame, the standard image data d1 of the produced standard frame provides an image with noise components removed.

The image processing unit 2 and CPU serve as standard frame producing means and dynamic range expanding means, wherein the standard frame producing means adds a predetermined number of image frames G to successively produce standard frames and the dynamic range expanding means expands a dynamic range of the standard frame.

The image processing unit 2 reads the standard image data d1 of the standard frame from the buffer memory 7, and performs YCbCr image producing process and an image correction process on the standard image data d1, and further performs an image compression process on the data, thereby obtaining image data in MPEG format. Further, the image processing unit 2 stores the data in MPEG format in the buffer memory 7.

Under control of CPU, the image processing unit 2 successively produces the difference image data d2 between the standard image data d1 of the standard frame produced in the plural frame adding process and each of four frames of original image data. More specifically, the image processing unit 2 performs, with respect to every picture element of each of four frames of image data, a subtracting process that subtracts a picture element value of a picture element of the standard image data of the standard frame from a picture element value of a corresponding picture element of the image data of one of the image frames G. The above subtracting process is performed with respect to the image data of every four image frames G, whereby plural frames of difference image data d2 are obtained. The difference image data d2 is different from P-Picture and B-Picture in MPEG format for I-Picture, but corresponds to data that is obtained by averaging four frames of image data, indicating difference from the standard frame.

Then, the image processing unit 2 transfers and stores the produced difference image data d2 in the buffer memory 7. The image processing unit 2 and CPU serve as difference information producing means for successively producing the difference image data d2 between the standard frame and each of predetermined number of image frames G added and combined in the plural frame adding process.

Further, the image processing unit 2 reads the difference image data d2 stored in the buffer memory 2 and performs a compression process on the read difference image data d2, thereby obtaining data in MPEG format and storing the obtained data in the buffer memory 7.

Further, under control of CPU the image processing unit 2 performs a process in an opposite way to the process which produces the difference image data d2, and reads the standard image frame from a standard image file F1 and adds the standard image frame to each of four frames of difference image data d2 read from a difference image file F2, thereby producing four frames of image data. More specifically, the image processing unit 2 performs a picture-element value adding process with respect to four frames of difference image data d2 to add a picture element value of each picture element of one frame of difference image data d2 and a picture element value of a corresponding picture element of the image data of the standard frame, thereby producing four frames of image data (original image frames H), which have been shot at a frame rate of 240 fps.

In the case where moving image data is subjected to an irreversible compression process when the data is stored in the standard image file F1 and difference image file F2, the same image data as four frames of original image data cannot be reproduced. But this phenomenon causes no practical problem.

The image processing unit 2 and CPU serve as original image frame producing means for adding difference image data d2 relating to each of the predetermined number of image frames G produced in the difference information producing process and standard frame, thereby successively producing the original image frames H.

The recording medium controlling unit 3 reads the standard image data d1 of the standard frame and difference image data d2 subjected to an image compression process and stored in the buffer memory 7, and stores the read data in the recording medium 4, when an moving image is shot.

The recording medium controlling unit 3 reads the standard image data d1 of the standard frame or the standard image file F1 subjected to the image compression process and stored in the recoding medium 4, and transfers and stores the read data in the buffer memory 7 in a first reproducing process and a second reproducing process of a moving image.

Figure 2:
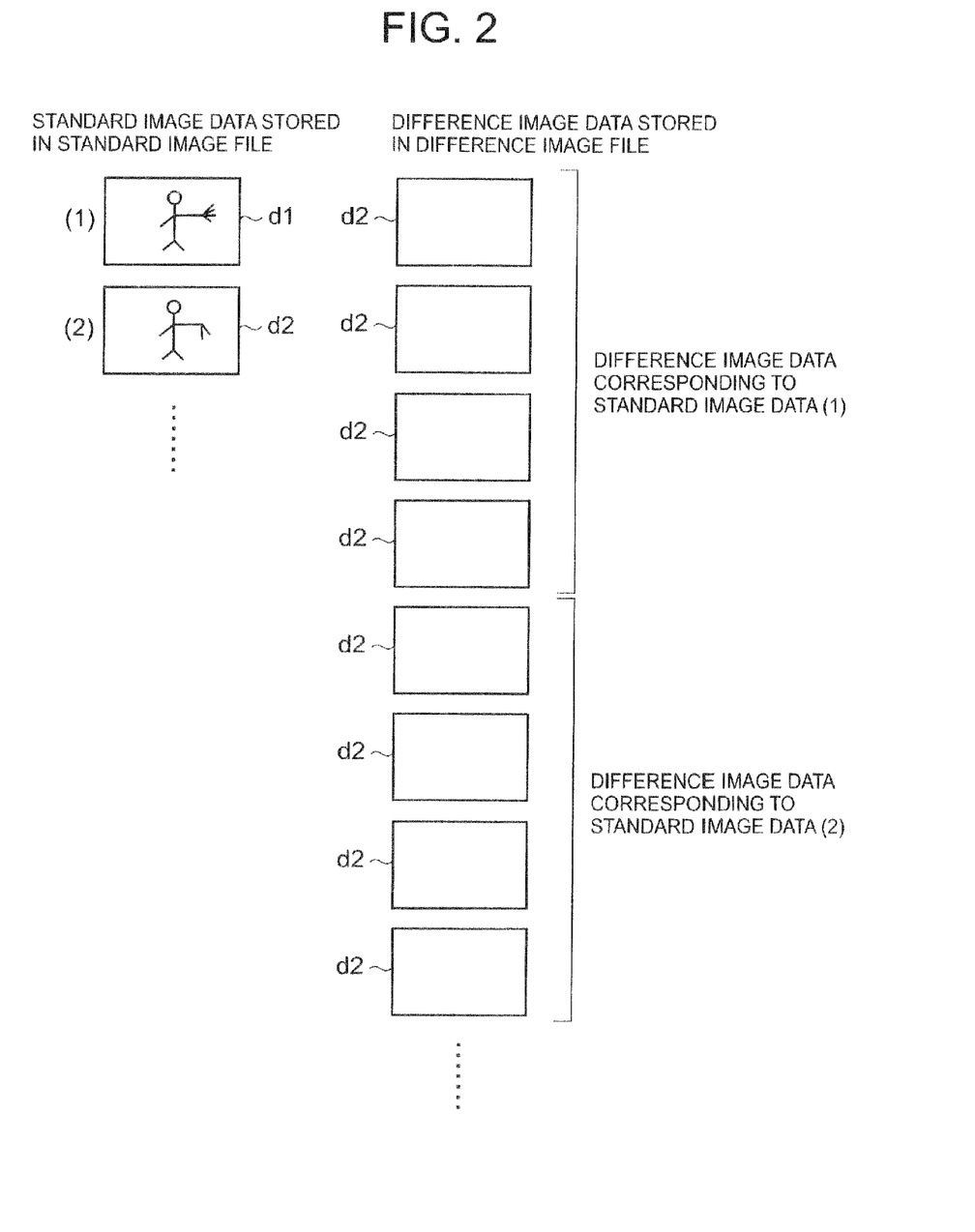
FIG. 2 is a view for explaining an image data reading operation in a slow motion reproducing process in the image pick-up apparatus.

In a slow motion image reproducing process, the recording medium controlling unit 3 reads from the recording medium 4 the difference image data d2 or the difference image file F2 subjected to the image compression process. More specifically, since the difference image data d2 has to be read corresponding to the standard frames read from the standard image file F1, the recording medium controlling unit 3 reads difference image data d2 (Refer to FIG. 2) corresponding to four frames from the first frame to "4×N−3~4×N"th frame of the difference image file F2, where "N" ("N"≧1) is the number from the head of the file of the standard frame read from the standard image file F1. For example, as shown in FIG. 2, the first to fourth difference image data d2 are read, when the difference image data d2 corresponding to standard image data d1(1) is read, where N=1, and the fifth to eighth difference image data d2 are read when the difference image data d2 corresponding to standard image data d1(2) is read, where N=2. The reading process is repeatedly performed. The recording medium controlling unit 3 transfers and stores the read difference image data d2 in the buffer memory 7.

The recording medium 4 comprises, for instance, a non-volatile card memory (flash memory) and/or a hard disk drive.

The recording medium 4 serves as standard file recording means for recording the standard image file F1 consisting only of plural standard frames successively produced in the plural frame adding process.

Further, the recoding medium 4 serves as difference file recording means for recoding the difference image data d2 successively produced in the difference information producing process not in the standard image file F1 but in the difference image file F2.

The display unit 5 comprises a liquid crystal image displaying device (not shown) and a display controlling unit (not shown) for displaying the image frame G on the liquid crystal image displaying device. The display unit 5 updates at a predetermined frame rate image frame G shot by the image pick-up unit 1, thereby displaying a live image.

Under control of CPU, the display unit 5 switches plural standard frames of the standard image file F1 at a reproducing frame rate of 60 fps. (standard reproducing frame rate) in the first reproducing process and second reproducing process of a moving image, thereby reproducing a moving image at a predetermined standard reproducing speed (normal reproducing speed).

Further, under control of CPU, the display unit 5 switches original image frames H successively produced in an original image frame producing process at a reproducing frame rate of 60 fps. in a slow motion image reproducing process, thereby reproducing a moving image at a slow motion reproducing speed (a reproducing speed lower than the predetermined standard reproducing speed).

The display unit 5 and CPU serve as reproducing means for reproducing a moving image.

The operation input unit 6 is manipulated to operate the image pick-up apparatus 100. The operation input unit 6 is provided with a shutter button for instructing the image pick-up unit 1 to record an image of an object, cursor buttons (up and down buttons, leftward and rightward buttons) that are operated to select various operation modes and items, and a decision button that is operated to decide an operation and/or an item selected with the cursor button.

For example, a still image shooting mode and a moving image shooting mode are prepared as operation modes, wherein the still image shooting mode is set for shooting a still image of a predetermined size and the moving image shooting mode is for shooting a moving image at a predetermined frame rate.

When a user selects an operation mode (for example, the moving image shooting mode), an instruction for setting the operation mode is given to CPU of the controlling unit 8 through an input circuit (not shown). Upon receipt of the instruction, CPU controls operations of various units in the image pick-up apparatus 100 to perform processes appropriate for the selected operation mode.

The operation input unit 6 gives an instruction to select a first reproducing process mode and second reproducing process mode as a moving image reproducing mode.

In the first reproducing process mode are performed a "normal reproducing operation" and a "slow motion reproducing operation". In the "normal reproducing operation", plural standard frames are switched at a reproducing frame rate of 60 fps. to reproduce a moving image, and in the "slow motion reproducing operation", plural original image frames H are switched at a reproducing frame rate of 60 fps. to reproduce a slow motion moving image.

In the second reproducing process mode are performed a "normal reproducing operation" and a "frame by frame reproducing operation". In the "normal reproducing operation", plural standard frames are switched at the reproducing frame rate of 60 fps. to reproduce a moving image, and in the "frame by frame reproducing operation", plural standard frames each are displayed at a reproducing frame rate of 60 fps. continuously four times in a frame-by-frame advancing manner.

In short, the standard frames and original image frames H are reproduced in the first reproducing process mode, and only the standard frames are reproduced in the second reproducing process mode.

The buffer memory 7 comprises, for example, a flash memory, and temporarily stores data to be processed by CPU.

The controlling unit 8 serves to control various units in the image pick-up apparatus 100. The controlling unit 8 is provided with CPU and a program memory (not shown).

CPU performs various control operations in accordance with programs stored in the program memory for controlling operation of the image pick-up apparatus 100.

The program memory serves to record various programs and data necessary for operation of CPU. The programs include a standard frame production controlling process routine, difference information production controlling process routine, original image frame production controlling process routine and reproduction controlling process routine. The routine is a part of a computer program and consists of a group of program codes having a function for performing a specific process.

The standard frame production controlling process routine is a part of a computer program having a function for making CPU serve as standard frame producing means. The standard frame production controlling process routine includes a group of program codes for CPU to make the image processing unit 2 perform the plural frame adding process, in which a predetermined number of image frames G among the plural image frames G, . . . produced by the image pick-up unit 1 are added and combined, whereby standard frames are successively produced to be reproduced at a reproducing frame rate lower than a predetermined shooting frame rate.

In other words, in accordance with the standard frame production controlling process routine, CPU makes the image processing unit 2 add and combine four continuous image frames G produced at a shooting frame rate of 240 fps. to produce one standard frame for a reproducing frame rate of 240 fps.

The difference information production controlling process routine is a part of the computer program having a function for making CPU serve as the difference information producing means. The difference information production controlling process routine includes a group of program codes for CPU to make the image processing unit 2 perform the difference information processing process, in which difference image data d2 between the standard frame and each of the predetermined number of image frames G added and combined in the plural frame adding process is successively produced.

In other words, in accordance with the difference information production controlling process routine, CPU makes the image processing unit 2 perform a process with respect to four frames of image data, which process subtracts a picture element value of each picture element of the standard image data from a picture element value of a corresponding picture element of the image data of one image frame G, thereby producing difference image data d2.

The original image frame production controlling process routine is a part of the computer program having a function for making CPU serve as original image frame production means. The original image frame production controlling process routine includes a group of program codes for CPU to make the image processing unit 2 perform an original image frame producing process which adds the standard frame and each of the predetermined number of image frames G of difference image data d2 successively produced in the difference information processing process, thereby successively producing original image frames H.

In other words, in accordance with the original image frame production controlling process routine, CPU makes the image processing unit 2 perform a process with respect to four frames of difference image data d2, which process that adds a picture element value of each picture element of the difference image data and a picture element value of a corresponding picture element of the image data of the standard frame, thereby producing the original image data H.

The reproduction controlling process routine is a part of the computer program having a function for making CPU serve as reproducing means. The reproduction controlling process routine includes a group of program codes for CPU to make the image processing unit 2 perform a reproducing process which switches the standard frames and original image frames H successively produced by the image producing unit 2 at a reproducing frame rate, for example, at a frame rate of 60 fps, thereby displaying a moving image on the display unit 5.

FIGS. 3, 6, 7 and 9 are flow charts for explaining whole operation of the image pick-up apparatus 100. An algorithm structure of the program stored in the program memory is indicated by these flow charts. Specific program codes for operation of CPU are not described, but can be written in accordance with the flow charts (algorithm structure).

A moving image shooting process will be described with reference to the flow chart of FIG. 3. The flow chart of FIG. 3 explains the moving image shooting operation of the image pick-up apparatus 100. FIG. 4 is a view for explaining the moving image shooting process.

The image pick-up apparatus 100 according to the present embodiment of the invention performs the moving image shooting operation at a high shooting frame rate, for instance, at a frame rate of 240 fps.

Figure 3:
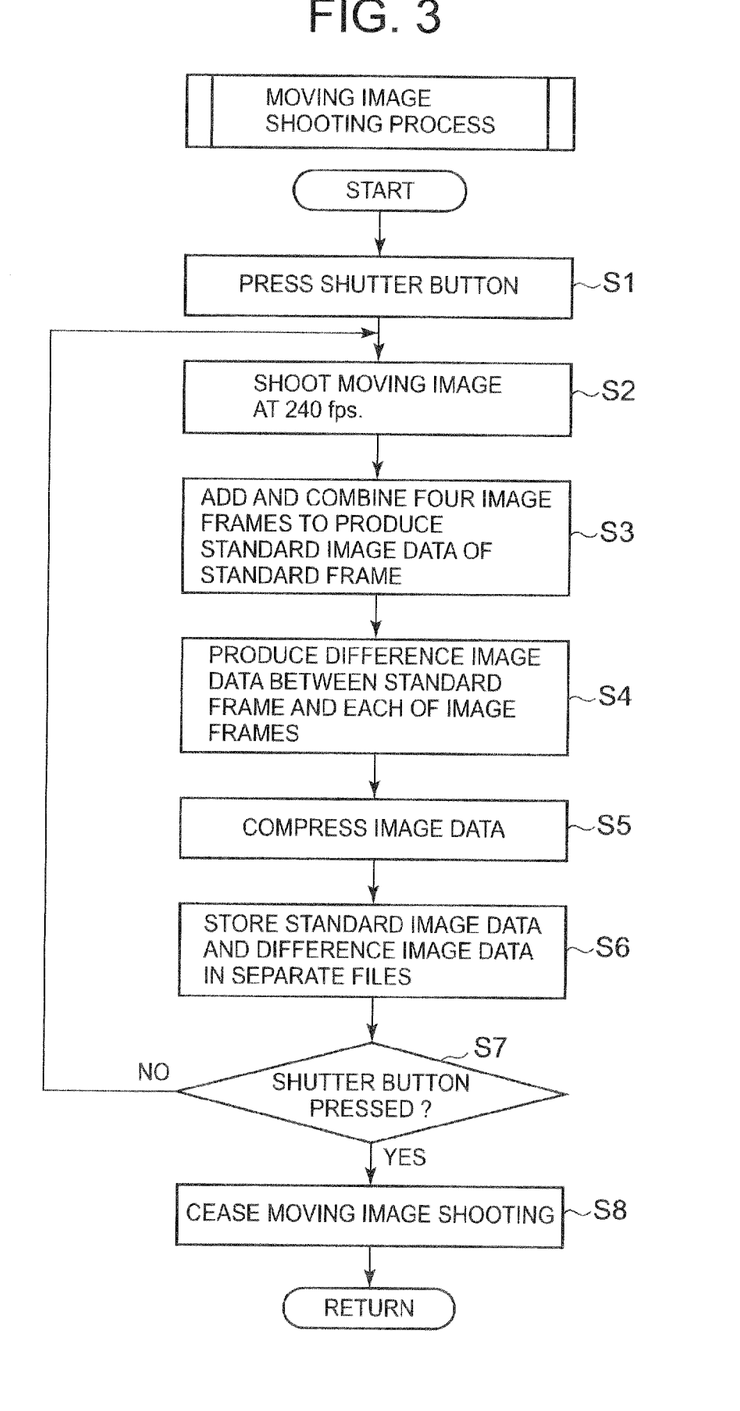
FIG. 3 is a flow chart of an example of a moving image shooting operation in the image pick-up apparatus.
Figure 4:
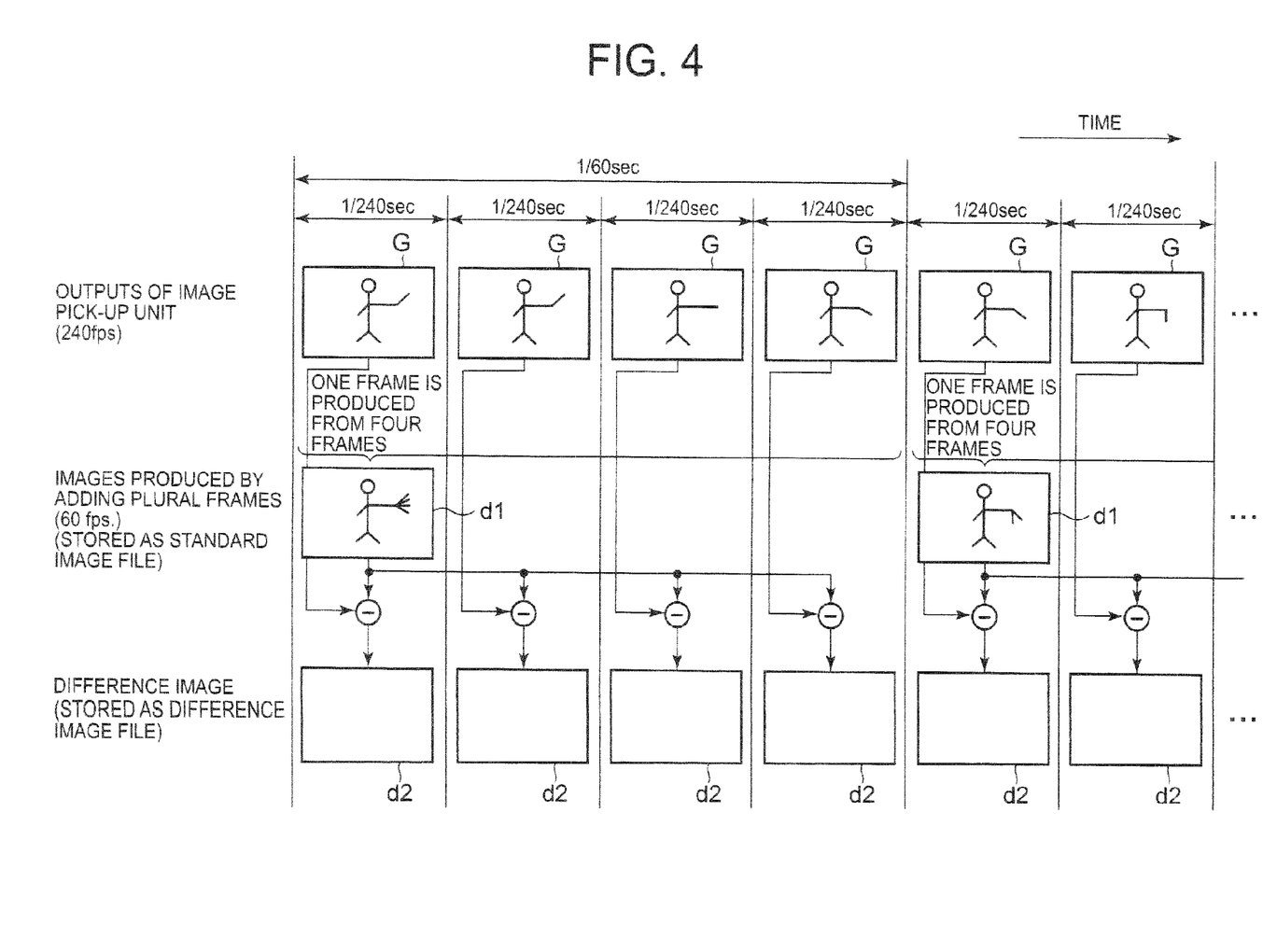
FIG. 4 is a view for explaining the moving image shooting operation of FIG. 3.

When the shutter button is pressed by a user at step S1 in FIG. 3, CPU gives the image pick-up unit 1, image processing unit 2 and recording medium controlling unit 3 an instruction to start the moving image shooting operation at a high frame rate (for example, at a frame rate of 240 fps.).

The image pick-up unit 1 shoots a moving image, thereby producing plural image frames G, . . . , and successively transfers and stores the produced image frames G in the buffer memory 7 at step S2 (Refer to FIG. 4).

In accordance with the standard frame production controlling process routine, CPU makes the image processing unit 2 add each picture element of four image frames G every time when four image frames G have been stored in the buffer memory 7, thereby producing standard image data d1 of one standard frame, as shown in FIG. 4, and transfers and stores the produced standard image data d1 in the buffer memory 7 at step S3.

Further, in accordance with the difference information production controlling process routine, CPU makes the image processing unit 2 successively produce difference image data d2 between the standard frame and each of four image frames G added and combined in the plural frame adding process, as shown in FIG. 4, and transfers and stores the four frames of produced difference image data d2 in the buffer memory 7 at step S4.

Thereafter, the image processing unit 2 reads the standard image data d1 of the standard frame stored in the buffer memory 7, and performs an image data compression process on the standard image data d1 to obtain, for example, data in MPEG format, and transfers and stores the compressed image data in the buffer memory 7 at step S5. Further, the image processing unit 2 reads the difference image data d2 stored in the buffer memory 7, and performs the image data compression process on the difference image data d2 to obtain data, for example, in MPEG format, and transfers and stores the compressed image data in the buffer memory 7 also at step S5.

The recoding medium controlling unit 3 reads the compressed standard image data d1 from the buffer memory 7 and stores in the recording medium 4 the compressed standard image data d1 as the standard image file F1 at step S6. Further, the recoding medium controlling unit 3 reads the compressed difference image data d2 from the buffer memory 7 and stores in the recording medium 4 the compressed difference image data d2 as the difference image file F2 also at step S6.

CPU judges at step S7 whether or not the shutter button has been operated by the user, again. When the shutter button has not been operated (NO at step S7), CPU returns to step S2, and performs the processes thereafter, again.

When the shutter button has been operated, again (YES at step S7), CPU gives the image pick-up unit 1, image processing unit 2 and recording medium controlling unit 3 an instruction to cease the moving image shooting operation at step S8.

Now, the moving image reproducing process to be performed in the image pick-up apparatus 100 will be described in detail with reference to FIG. 5 to FIG. 9.

Figure 5:
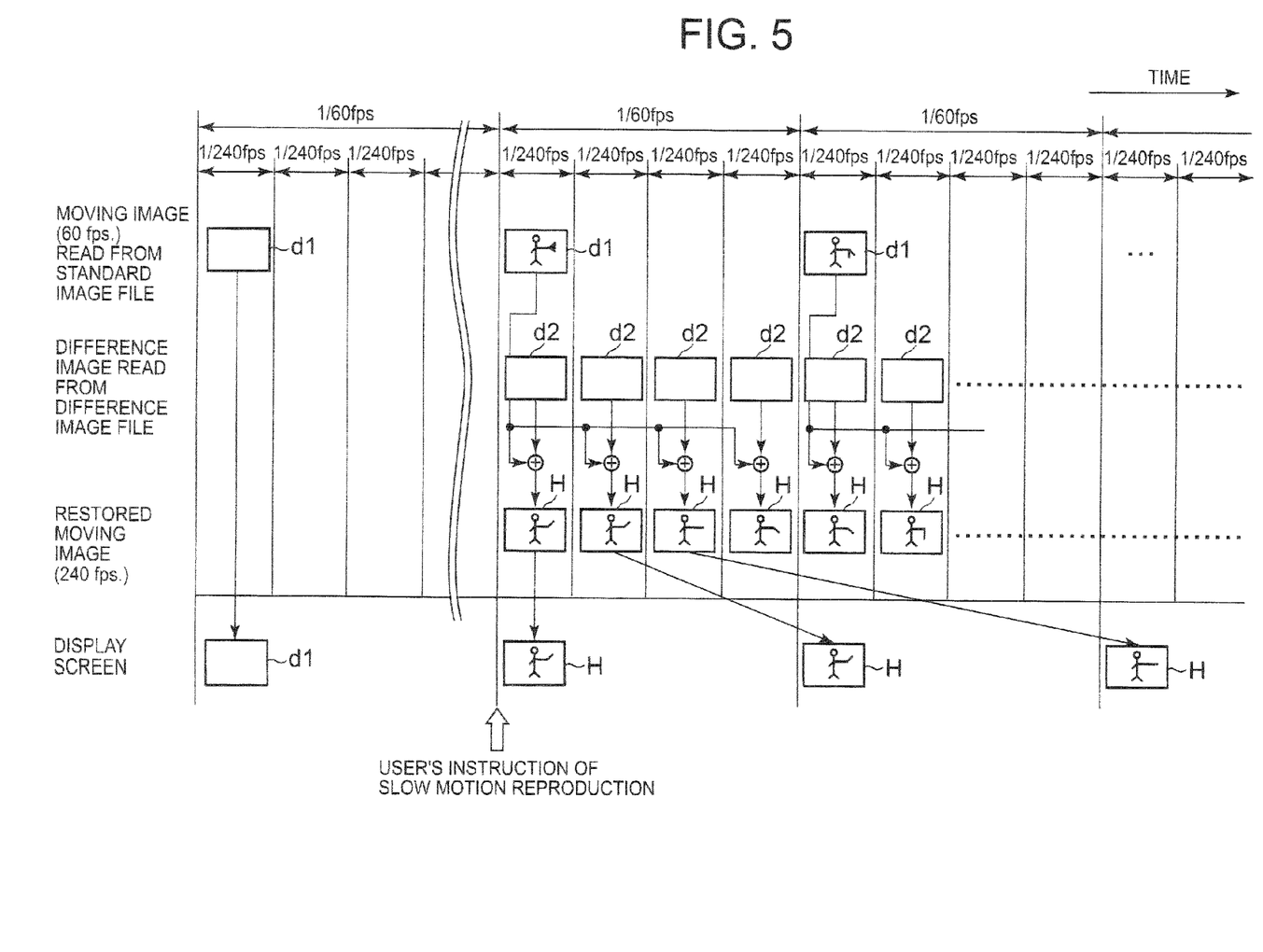
FIG. 5 is a view for explaining a first moving image reproducing process in the image pick-up apparatus.
Figure 6:
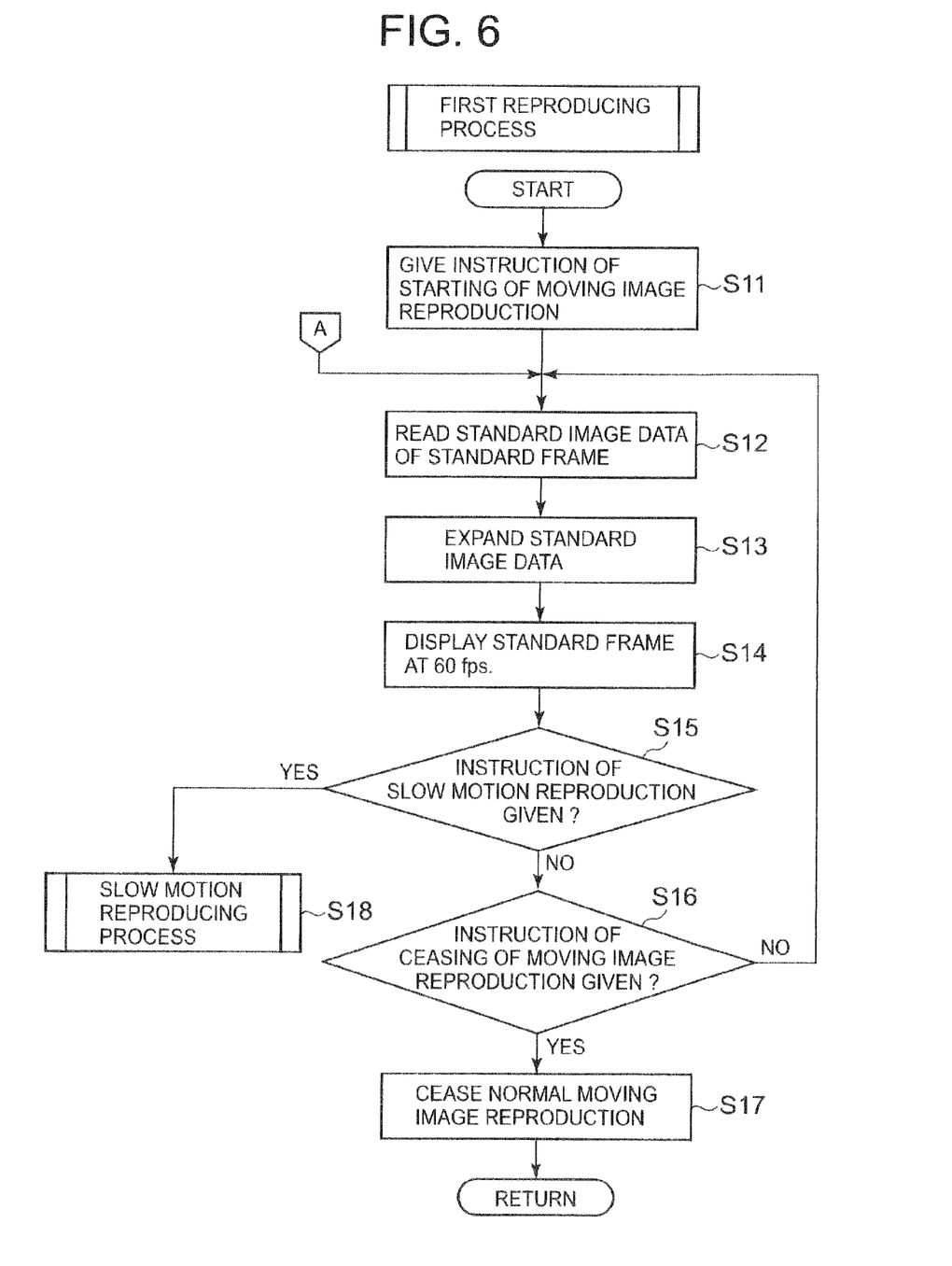
FIG. 6 is a flow chart showing an example of operation in the first moving image reproducing process of FIG. 5.
Figure 7:
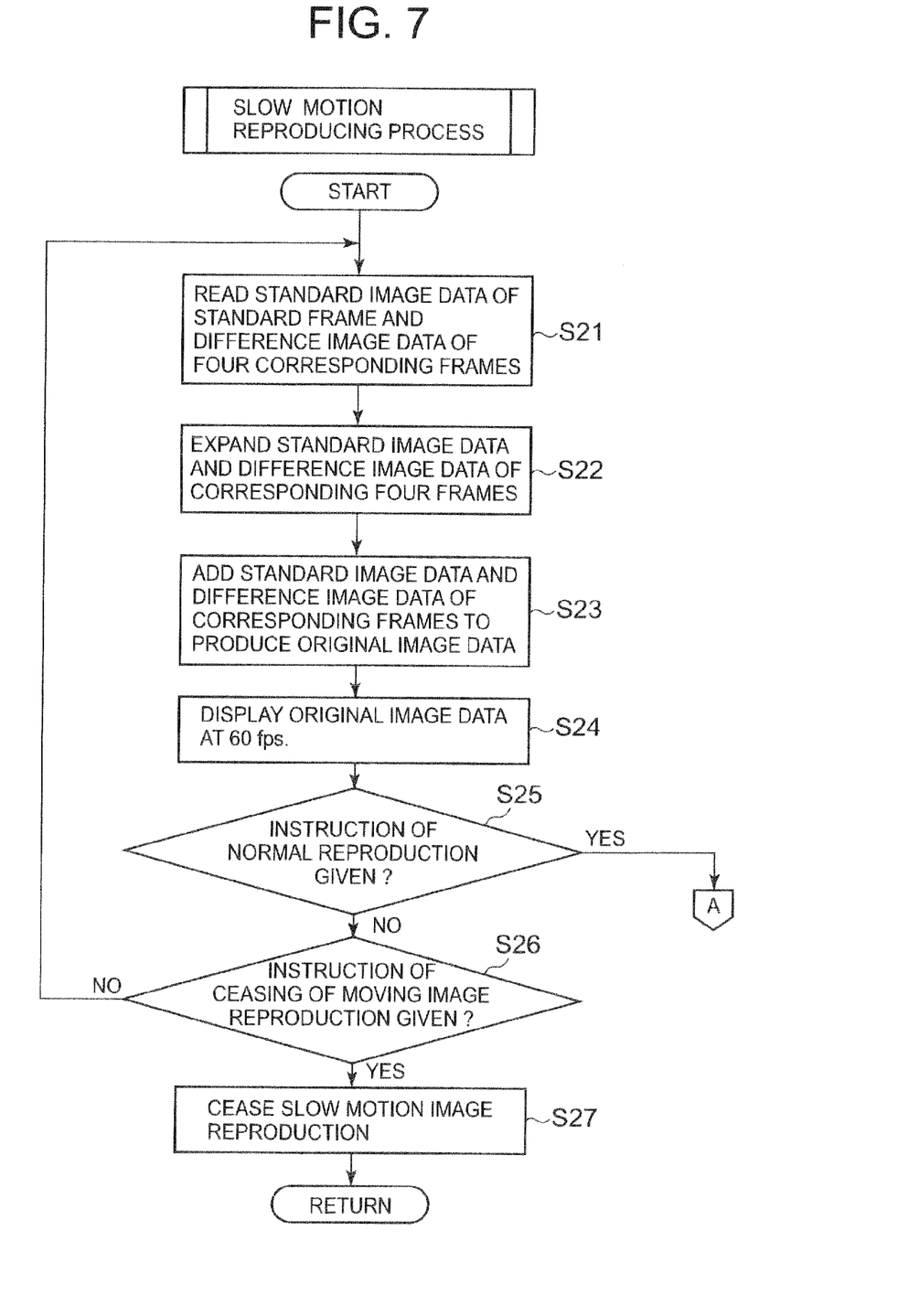
FIG. 7 is a flow chart of an example of operation in a slow motion reproducing process in the first moving image reproducing process of FIG. 5.

The first reproducing process for reproducing a moving image will be described with reference to FIG. 5 to FIG. 7. FIG. 5 is a view for explaining the first reproducing process to be performed in the image pick-up apparatus 100 to reproduce a moving image. FIG. 6 is a flow chart showing an example of operation in the first reproducing process for reproducing a moving image.

The first reproducing process is performed, when the first reproducing process mode has been set as the moving image reproducing mode in accordance with user's operation on the operation input unit 6.

Assuming that a "normal reproduction" has been set, in which plural standard frames are switched and reproduced at a frame rate of 60 fps., the first reproducing process will be described.

When an instruction of reproducing of a moving image is given in response to user's operation on the operation input unit 6 at step S11, CPU gives the image processing unit 2, recording medium controlling unit 3 and the display unit 5 an instruction to start a normal moving image reproducing operation at a frame rate of 60 fps. The recording medium controlling unit 3 reads at a frame rate of 60 fps. the standard image data d1 of the standard frame from the standard image file F1 stored in the recording medium 4 and stores the read standard image data d1 in the buffer memory 7 at step S12.

The image processing unit 2 reads the standard image data d1 stored by the recording medium controlling unit 3 and performs an image data expanding process on the compressed standard image data d1 at a frame rate of 60 fps. and further transfers and stores the expanded standard image data d1 in the buffer memory 7 at step S13.

Further, in accordance with the reproduction controlling process routine, CPU reads the standard image data d1 from the buffer memory 7 every time when the standard image data d1 of the standard frame has been stored in the buffer memory 7, and makes a size adjustment of data to be displayed on the display unit 5 to convert a resolution of the data, and then a normal reproduction is performed at step S14, which switches each standard frame at a frame rate of 60 fps. to reproduce the standard frame on the display unit 5.

CPU judges at step S15 whether or not an instruction of a slow motion image reproduction has been given in response to user's operation on the operation input unit 6. When the instruction of a slow motion image reproduction has not been given at step S15 (No at step S15), CPU judges at step S16 whether or not an instruction of ceasing the moving image reproducing operation has been given in response to user's operation on the operation input unit 6.

When the instruction of ceasing the moving image reproducing operation has not been given at step S16 (NO at step S16), CPU returns to step S12 and performs the processes thereafter, again.

When the instruction of ceasing the moving image reproducing operation has been given at step S16 (YES at step S16), CPU gives the image processing unit 2 and the recording medium controlling unit 3 an instruction of ceasing the normal reproduction of a moving image at step S17.

Meanwhile, when the instruction of a slow motion image reproduction has been given in response to user's operation on the operation input unit 6 (YES at step S15), CPU moves to step S18 to perform a slow motion reproducing process.

Now, the slow motion reproducing process will be described in detail with reference to a flow chart of FIG. 7. The flow chart of FIG. 7 describes the slow motion reproducing process.

In the slow motion image reproducing process in the first reproducing process, the original image frame H is restored from the standard image data d1 of the standard frame and the difference image data d2, and the slow motion image reproduction is performed, in which plural original image frames H, . . . , are switched and reproduced at a frame rate of 60 fps.

When a "slow motion image reproduction" is selected as a moving image reproducing speed, CPU gives the image processing unit 2, recording medium controlling unit 3 and the display unit 5 an instruction of switching to the slow motion image reproduction. The recording medium controlling unit 3 reads the standard image data d1 of the standard frame from the standard image file F1 stored in the recording medium 4 (Refer to FIG. 2) and further reads four frames of difference image data d2 corresponding to the standard image data d1 from the difference image file F2 stored in the recording medium 4 (Refer to FIG. 2), and then stores the image data d1, d2 in the buffer memory 7 at step S21 in FIG. 7.

The image processing unit 2 reads the standard image data d1 and the four frames of difference image data d2 which have been stored in the buffer memory 7 by the recording medium controlling unit 3 at step S21, and performs the image data expanding process on the compressed standard image data d1 and difference image data d2 at a frame rate of 60 fps. and transfers and stores the expanded data d1, d2 in the buffer memory 7 at step S22.

In accordance with the original image frame production controlling process routine, CPU makes the image processing unit 2 read from the buffer memory 7 one frame of expanded standard image data d1 and four frames of expanded difference image data d2 every time when one frame of expanded standard image data d1 and four frames of expanded difference image data d2 have been stored in the buffer memory 7. Further, CPU makes the image processing unit 2 add one frame of standard image data d1 and each of four frames of difference image data d2 to produce four frames of original image frames H at step S23 as shown in FIG. 5. The image processing unit 2 transfers and stores the four frames of produced original image frames H in the buffer memory 7.

In accordance with reproduction controlling process routine, CPU reads the original image frames H and makes a size adjustment of data to be displayed on the display unit 5 to convert a resolution of the data, thereby performing the slow motion image reproduction at step S24 in which the original image frames H are switched at a frame rate of 60 fps to be displayed on the display unit 5 as shown in FIG. 5.

CPU judges at step S25 whether or not an instruction of a normal moving image reproduction has been given in response to user's operation on the operation input unit 6. When the instruction of a normal moving image reproduction has not been given at step S25 (NO at step S25), CPU judges at step S26 whether or not an instruction of ceasing the moving image reproduction has been given in response to user's operation on the operation input unit 6.

When the instruction of ceasing the moving image reproduction has not been given at step S26 (NO at step S26), CPU returns to step S21 and performs the processes thereafter again.

When the instruction of ceasing the moving image reproduction has been given at step S26 (YES at step S26), CPU gives the image processing unit 2, the recording medium controlling unit 3 and the display unit 5 an instruction of ceasing the slow motion image reproduction at step S27.

Meanwhile, when the instruction of a normal moving image reproduction has been given in response to the user's operation on the operation input unit 6 at step S25 (YES at step S25), CPU returns to step S12 in the first reproducing process shown in FIG. 6, and performs the processes thereafter again.

When the instruction of a slow motion image reproduction has been given at step S15 (YES at step S15), CPU performs the slow motion image reproduction. Meanwhile, when the instruction of a normal moving image reproduction has been given at step S25 (YES at step S25), CPU performs the normal reproduction again.

The order in which the normal reproducing process and the slow motion reproducing process are performed is one example. The normal reproducing process and the slow motion reproducing process can be performed in any order.

Figure 8:
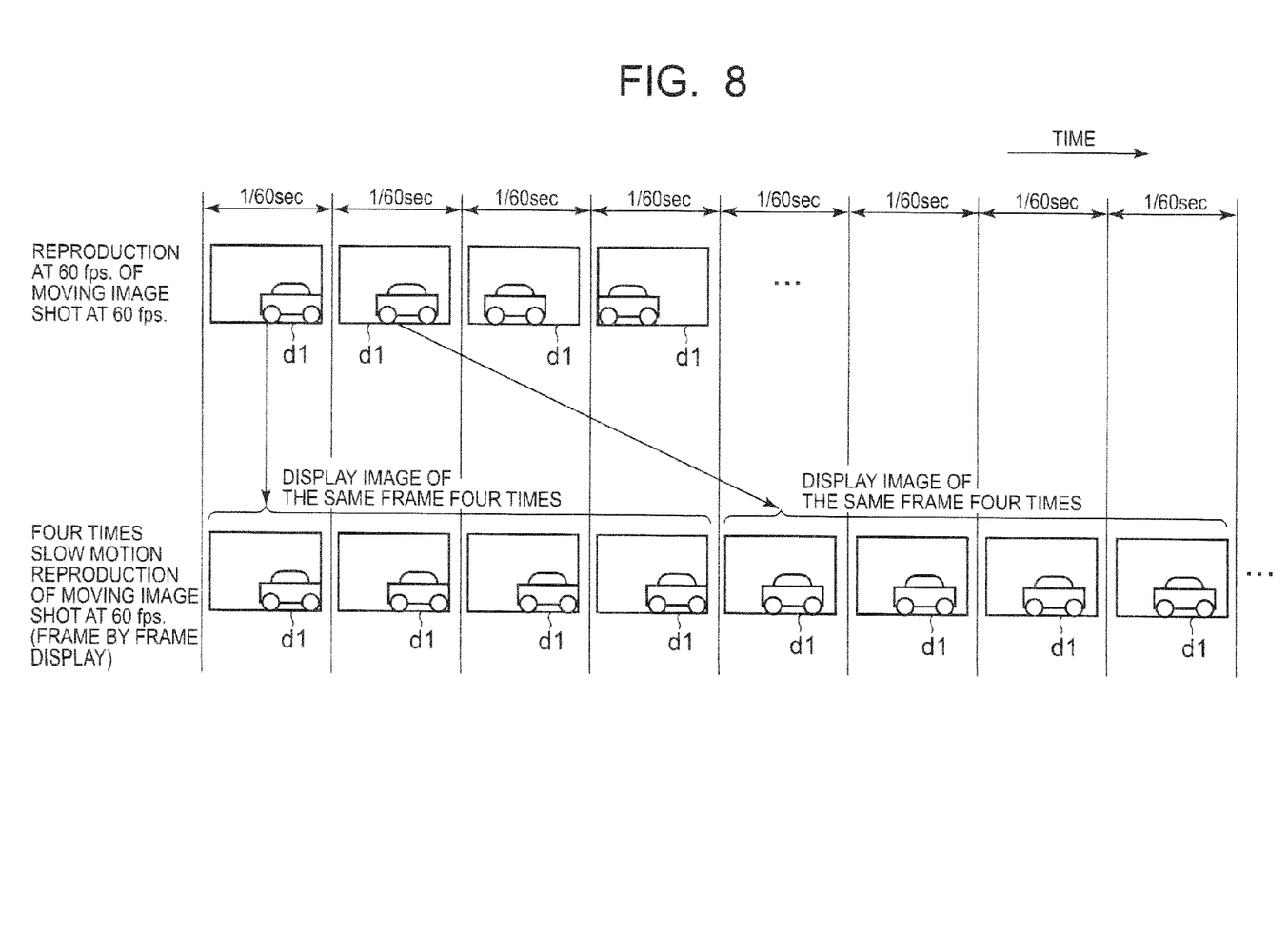
FIG. 8 is a view for explaining a second moving image reproducing process in the image pick-up apparatus.
Figure 9:
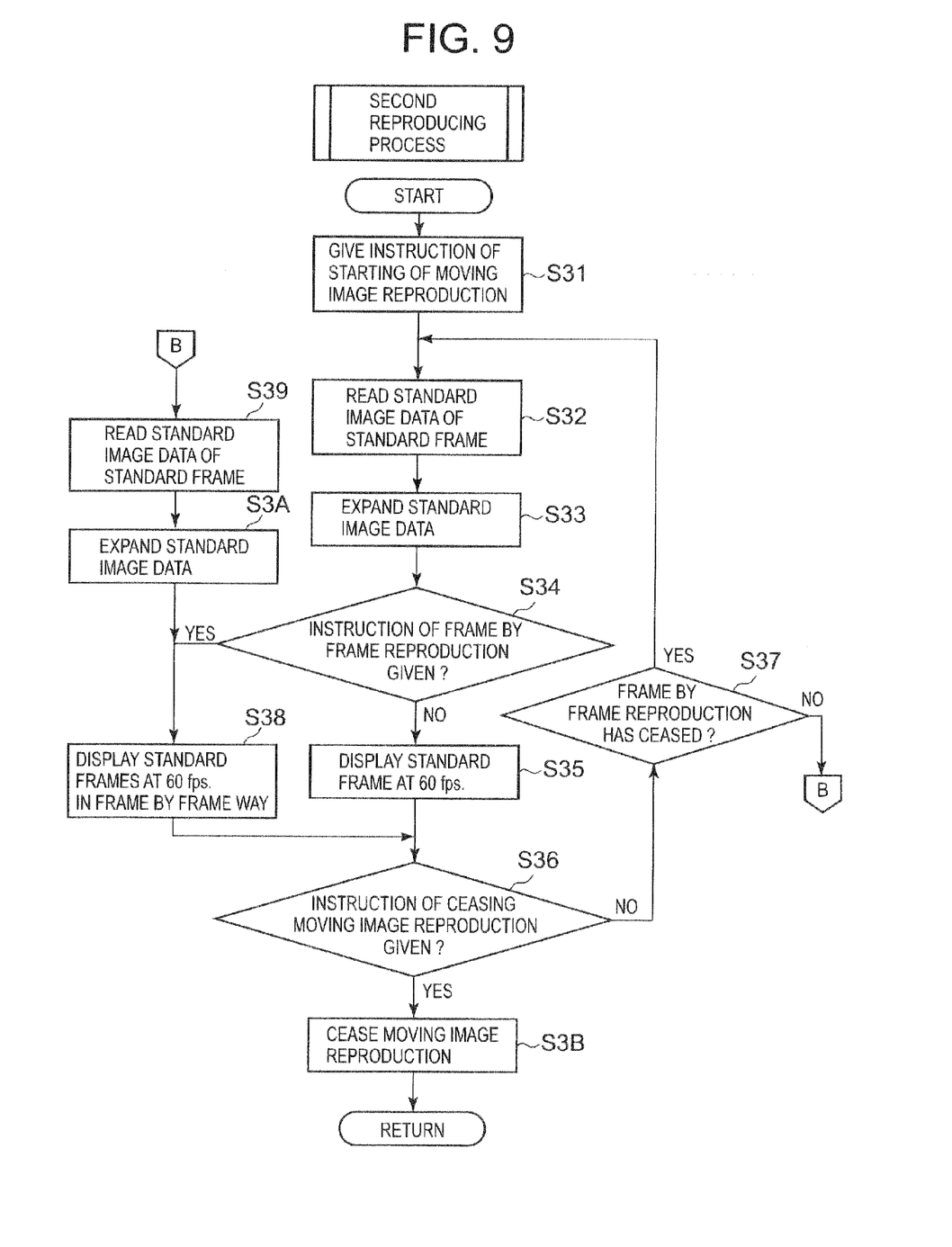
FIG. 9 is a flow chart of an example of operation in the second moving image reproducing process of FIG. 8.

The second reproducing process for reproducing a moving image will be described with reference to FIGS. 8 and 9. FIG. 8 is a view for explaining the second reproducing process of a moving image, performed in the image pick-up apparatus 100. FIG. 9 is a flow chart of an example of operation in the second reproducing process.

The second reproducing process is performed when the second reproducing process mode has been set as the moving image reproducing mode in response to user's operation on the operation input unit 6.

When an instruction of a moving image reproduction has been given in response to the user's operation on the operation input unit 6 at step S31 in FIG. 9, CPU gives the image processing unit 2, recording medium controlling unit 3 and the display unit 5 an instruction to start the normal moving image reproducing operation at a frame rate of 60 fps. The recording medium controlling unit 3 reads at a frame rate of 60 fps. the standard image data d1 of the standard frame from the standard image file F1 stored in the recording medium 4 and stores the read standard image data d1 in the buffer memory 7 at step S32. The image processing unit 2 reads the standard image data d1 stored by the recording medium controlling unit 3 and performs the image data expanding process on the compressed standard image data d1 at a frame rate of 60 fps. and further transfers and stores the expanded standard image data d1 in the buffer memory 7 at step S33.

CPU judges at step S34 whether or not an instruction of starting a "frame by frame reproducing operation" of a moving image has been given in response to user's operation on the operation input unit 6.

When the instruction of starting a "frame by frame reproducing operation" has not been given at step S34 (NO at step S34), in accordance with the reproduction controlling process routine CPU reads the standard image data d1 from the buffer memory 7, every time when one standard frame of standard image data d1 has been stored in the buffer memory 7, and makes a size adjustment of data to be displayed on the display unit 5 to convert a resolution of the data, thereby performing the normal reproduction in which the original image frames H are switched at a frame rate of 60 fps to be displayed on the display unit 5 at step S35 as shown in FIG. 5.

CPU judges at step S36 whether or not an instruction of ceasing of the normal moving image reproduction has been given in response to user's operation on the operation input unit 6.

When the instruction of ceasing of the normal moving image reproduction has riot been given at step S36 (NO at step S36), CPU judges at step S37 whether or not the "frame by frame reproducing operation" has been ceased in response to the user's operation on the operation input unit 6. Since no instruction of starting the frame by frame reproducing operation has been given at step S34, it is determined at step S37 that the "frame by frame reproducing operation" has been ceased (YES at step S37). Then, CPU returns to step S32 and performs the processes thereafter again.

Meanwhile, when the instruction of starting the frame by frame reproducing operation has been given at step S34 (YES at step S34), in accordance with the reproduction controlling process routine CPU reads the standard image data d1 from the buffer memory 7, every time when one standard frame of standard image data d1 has been stored in the buffer memory 7, and makes a size adjustment of data to be displayed on the display unit 5 to convert a resolution of the data, thereby performing the frame by frame reproduction in which the standard frames are displayed on the display unit 5 at a frame rate of 60 fps. continuously four times at step S38 as shown in FIG. 8.

Thereafter, CPU advances to step S36 to judge whether or not an instruction of ceasing the moving image reproducing operation has been given. When the instruction of ceasing the moving image reproducing operation has not been given at step S36 (NO at step S36), CPU judges at step S37 whether or not the frame by frame reproducing operation has been ceased.

When the frame by frame reproducing operation has not been ceased at step S37 (NO at step S37), the recording medium controlling unit 3 reads at a frame rate of 60 fps. the standard image data d1 of the standard frame from the standard image file F1 stored in the recording medium 4 and stores the read standard image data d1 in the buffer memory 7 at step S39. The image processing unit 2 reads the standard image data d1 stored by the recording medium controlling unit 3 and performs the image data expanding process on the compressed standard image data d1 at a frame rate of 60 fps. and further transfers and stores the expanded standard image data d1 in the buffer memory 7 at step S3A.

Then, CPU advances to step S38 to performs the following processes.

When the instruction of ceasing the moving image reproducing operation has been given at step S36 (YES at step S36), CPU gives the image processing unit 2, the recording medium controlling unit 3 and the display unit 5 an instruction of ceasing of the moving image reproducing operation at step S3B.

As described above, the image pick-up apparatus 100 of the present embodiment adds and combines a predetermined number of image frames G among plural image frames G, . . . , thereby successively producing the standard frames to be reproduced at a reproducing frame rate (for example, 60 fps.) lower than a shooting frame rate of 240 fps. and stores a standard image file F1 consisting only of the standard frames. The standard frames are read from the standard image file F1 and switched at a reproducing frame rate for a normal speed reproduction. In the normal speed reproduction, a moving image can be reproduced with noises removed. The standard image data d1 of the standard frames in the standard image file F1 can be reproduced by an image pick-up apparatus other than the present image pick-up apparatus 100. Therefore, a moving image can be reproduced with noises removed, simply by transferring the standard image file F1 to other image pick-up apparatus 100 and/or a moving image reproducing apparatus.

Further, difference image data d2 between the standard frame and each of a predetermined number of image frames G added and combined in the plural frame adding process is successively produced and the difference image data d2 is stored in the difference image file F2 different from the standard image file F1. The standard frame and the difference image data d2 relating to each of the predetermined number of image frames G are added to produce original image frames H, and the original image frames H are switched at a reproducing frame rate, whereby the slow motion image reproduction can be performed at a reproducing speed lower than the normal reproducing speed. As described above, an ultra slow speed reproduction can be realized with a higher temporal resolution than in the conventional image pick-up apparatus.

In the case where the second reproducing process mode is set as the moving image reproducing mode, the standard frames can be reproduced frame by frame and therefore a moving image can be reproduced with noises removed at a reproducing speed lower than the normal reproducing speed.

The present invention provides a user friendly image pick-up apparatus which is capable of reproducing a moving image in various ways.

The present invention is not restricted to the embodiments described above, and various modifications and alterations in design may be made as far as they remain in the scope of the invention.

For example, in the above embodiments, the original image frames H are reproduced on the display unit 5 at a constant reproducing frame rate of 60 fps. (standard reproducing frame rate), but it is possible to switch the original image frames H at a frame rate higher than the standard reproducing frame rate, thereby reproducing the original frames H at a predetermined reproducing speed.

In other words, if a frame rate that allows data to be displayed on the display unit 5 is 240 fps., a restored moving image for a frame rate of 240 fps. may be displayed without being subjected to any process. Furthermore, the restored original image frames for a frame rate of 240 fps., whose frame rate is changed to a frame rate (for example, 120 fps.) that can be displayed on the display unit 5 by adding plural frames, may be displayed on the display unit 5.

As described above, a moving image can be reproduced at various frame rates, and therefore a wide variety of moving image reproductions can be realized and more user friendly image pick-up apparatuses may be provided.

In the above embodiments, the plural frames adding process is performed, in which an averaging is effected every picture element of the image frames G, but the plural frames adding process may be performed in other ways.

Improvement may be made such that, when mismatch between picture elements of the image frames G is detected, misalignment between image frames G is corrected and thereafter the plural frame adding process is performed, whereby misalignment of an object in the standard frames can be prevented.

In the embodiments, one standard frame is produced from four image frames, but any number of image frames to be subjected to the plural frame adding process may be used to produce the standard frame.

In the embodiments, the standard image data d1 and difference image data d2 are stored in separate files. But there is no need for the data d1, d2 to be stored in the separate file, but the data d1, d2 may be stored in the same file. In this case, it is preferable to set markers the standard image data d1 and the difference image data d2, thereby distinguishing precisely between them.

In the embodiments, the image pick-up apparatus 100 is described, which produces the standard image data d1 and difference image data d2 and then records the produced data in the recording medium 4. Any apparatus may be employed, which records the standard image data d1 and difference image data d2 separately.

In other words, modification may be made, such that the standard image data d1 and difference image data d2 recorded in a recording medium are transferred to another apparatus such as a personal computer through communication means and the standard frames are reproduced at the normal reproducing speed in the another apparatus or that original image frames H are produced and reproduced at a slow motion frame rate in the another apparatus.

In the embodiments, the moving image data is compressed in MPEG format, but may be compressed in any other format.

The circuit configuration of the image pick-up apparatus 100 is described by way of example in the embodiments, but is not restricted to the embodiments.

In the embodiments, a computer program is installed in the image pick-up apparatus, and the computer program is executed by CPU to cause CPU to serve as standard frame producing means, difference information producing means, original image frame producing means and reproducing means, but logic circuits may be employed, which function as the standard frame producing means, difference information producing means, original image frame producing means and reproducing means.

What is claimed is:

1. An image pick-up apparatus comprising:
   an image pick-up unit for shooting a scene at a predetermined shooting frame rate to successively produce plural image frames;
   a reproducing unit for reproducing a moving image at a reproducing speed based on the plural image frames produced by the image pick-up unit;
   a standard frame producing unit for adding and combining the image frames in a group of a predetermined number of the image frames produced by the image pick-up unit to produce a standard frame, wherein the standard frame producing unit performs the adding and combining for a plurality of successive groups of the image frames to successively produce a plurality of standard frames to be reproduced at a standard reproducing frame rate by the reproducing unit, wherein the standard reproducing frame rate is lower than the predetermined shooting frame rate; and
   a difference information producing unit for successively producing difference information between each standard frame and each of the image frames in the group of the predetermined number of the image frames produced by the image pick-up unit that were added and combined to produce said each standard frame.

2. The image pick-up apparatus according to claim 1, wherein the reproducing unit switches at the standard reproducing frame rate only the standard frames successively produced by the standard frame producing unit, thereby reproducing the moving image at a predetermined standard reproducing speed.

3. The image pick-up apparatus according to claim 2, further comprising:
   an original image frame producing unit for adding each standard frame to the difference information relating to each of the predetermined number of the image frames that were added and combined to produce the standard frame, thereby successively producing original image frames,
   wherein the reproducing unit switches at the standard reproducing frame rate the original image frames successively produced by the original image frame producing unit, thereby reproducing the moving image at a reproducing speed that is lower than a predetermined standard reproducing speed.

4. The image pick-up apparatus according to claim 2, further comprising:
   an original image frame producing unit for adding each standard frame to the difference information relating to each of the predetermined number of the image frames that were added and combined to produce the standard frame, thereby successively producing original image frames,
   wherein the reproducing unit switches at the standard reproducing frame rate the original image frames successively produced by the original image frame producing unit, thereby reproducing the moving image at a reproducing speed that is lower than the predetermined standard reproducing speed.

5. The image pick-up apparatus according to claim 2, further comprising:
   an original image frame producing unit for adding each standard frame to the difference information relating to each of the predetermined number of the image frames that were added and combined to produce the standard frame, thereby successively producing original image frames,
   wherein the reproducing unit switches at a high frame rate the original image frames successively produced by the original image frame producing unit, thereby reproducing the moving image at the predetermined standard reproducing speed, wherein the high frame rate is higher than the standard reproducing frame rate.

6. The image pick-up apparatus according to claim 2, wherein the standard frame producing unit comprises a dynamic expanding unit for adding and combining the predetermined number of the image frames produced by the image pick-up unit to expand a dynamic range of the standard frame.

7. The image pick-up apparatus according to claim 2, further comprising:
a standard file recording unit for recording a standard file consisting only of the standard frames successively produced by the standard frame producing unit.

8. The image pick-up apparatus according to claim 7, further comprising:
an original image frame producing unit for adding each standard frame to the difference information relating to each of the predetermined number of the image frames that were added and combined to produce the standard frame, thereby successively producing original image frames,
wherein the reproducing unit switches at the standard reproducing frame rate the original image frames successively produced by the original image frame producing unit, thereby reproducing the moving image at a reproducing speed that is lower than the predetermined standard reproducing speed.

9. The image pick-up apparatus according to claim 7, further comprising:
an original image frame producing unit for adding each standard frame to the difference information relating to each of the predetermined number of the image frames that were added and combined to produce the standard frame, thereby successively producing original image frames,
wherein the reproducing unit switches at a high frame rate the original image frames successively produced by the original image frame producing unit, thereby reproducing the moving image at the predetermined standard reproducing speed, wherein the high frame rate is higher than the standard reproducing frame rate.

10. The image pick-up apparatus according to claim 7, wherein the standard frame producing unit comprises a dynamic expanding unit for adding and combining the predetermined number of the image frames produced by the image pick-up unit to expand a dynamic range of the standard frame.

11. The image pick-up apparatus according to claim 7, further comprising:
a difference file recording unit for recording the difference information successively produced by the difference information producing unit in a difference file, wherein the difference file is prepared separate from the standard file.

12. The image pick-up apparatus according to claim 11, further comprising:
an original image frame producing unit for adding each standard frame to the difference information relating to each of the predetermined number of the image frames that were added and combined to produce the standard frame, thereby successively producing original image frames,
wherein the reproducing unit switches at the standard reproducing frame rate the original image frames successively produced by the original image frame producing unit, thereby reproducing the moving image at a reproducing speed that is lower than the predetermined standard reproducing speed.

13. The image pick-up apparatus according to claim 11, further comprising:
an original image frame producing unit for adding each standard frame to the difference information relating to each of the predetermined number of the image frames that were added and combined to produce the standard frame, thereby successively producing original image frames,
wherein the reproducing unit switches at a high frame rate the original image frames successively produced by the original image frame producing unit, thereby reproducing the moving image at the predetermined standard reproducing speed, wherein the high frame rate is higher than the standard reproducing frame rate.

14. The image pick-up apparatus according to claim 11, wherein the standard frame producing unit comprises a dynamic expanding unit for adding and combining the predetermined number of the image frames produced by the image pick-up unit to expand a dynamic range of the standard frame.

15. The image pick-up apparatus according to claim 1, further comprising:
an original image frame producing unit for adding each standard frame to the difference information relating to each of the predetermined number of the image frames that were added and combined to produce the standard frame, thereby successively producing original image frames,
wherein the reproducing unit switches at a high frame rate the original image frames successively produced by the original image frame producing unit, thereby reproducing the moving image at a predetermined standard reproducing speed, wherein the high frame rate is higher than the standard reproducing frame rate.

16. The image pick-up apparatus according to claim 1, wherein the standard frame producing unit comprises a dynamic expanding unit for adding and combining the predetermined number of the image frames produced by the image pick-up unit to expand a dynamic range of the standard frame.

17. A non-transitory computer readable recording medium having a program recorded thereon that is executable by a computer of an image pick-up apparatus that includes an image pick-up unit for shooting a scene at a predetermined shooting frame rate to successively produce plural image frames, the program being executable to cause the computer function as units comprising:
a reproducing unit for reproducing a moving image at a reproducing speed based on the plural image frames produced by the image pick-up unit;
a standard frame producing unit for adding and combining the image frames in a group of a predetermined number of the image frames produced by the image pick-up unit to produce a standard frame, wherein the standard frame producing unit performs the adding and combining for a plurality of successive groups of the images frames to successively produce a plurality of standard frames to be reproduced at a standard reproducing frame rate by the reproducing unit, wherein the standard reproducing frame rate is lower than the predetermined shooting frame rate; and
a difference information producing unit for successively producing difference information between each standard frame and each of the image frames in the group of the predetermined number of the image frames produced by the image pick-up unit that were added and combined to produce said each standard frame.

* * * * *